United States Patent [19]

Wiesinger et al.

[11] Patent Number: 4,460,031
[45] Date of Patent: Jul. 17, 1984

[54] ARRANGEMENT FOR PREVENTING SLAG FROM PENETRATING INTO A CONTINUOUS CASTING MOULD DURING CONTINUOUS CASTING

[75] Inventors: Horst Wiesinger; Fritz Gränitz; Reinhard Hargassner; Hubert Bramberger, all of Linz, Austria

[73] Assignee: Voest-Alpine Aktiengesellschaft, Linz, Austria

[21] Appl. No.: 214,131

[22] Filed: Dec. 8, 1980

[30] Foreign Application Priority Data

Jan. 25, 1980 [AT] Austria ................................ 412/80

[51] Int. Cl.³ .............................................. B22D 11/16
[52] U.S. Cl. .................................... 164/150; 164/450; 164/453
[58] Field of Search ............... 164/453, 457, 449, 450, 164/155, 156, 150

[56] References Cited

U.S. PATENT DOCUMENTS

| 2,135,184 | 11/1938 | Junghans | 164/450 |
| 3,050,793 | 8/1962 | Tragner et al. | 164/156 |
| 3,536,124 | 10/1970 | Hanas et al. | 164/449 |
| 3,842,894 | 10/1974 | Southworth et al. | 164/453 |
| 4,079,918 | 3/1978 | Truppe et al. | 164/154 X |

FOREIGN PATENT DOCUMENTS

| 178698 | 6/1954 | Austria . | |
| 248043 | 7/1966 | Austria . | |
| 877325 | 10/1979 | Belgium . | |
| 1458134 | 1/1969 | Fed. Rep. of Germany . | |
| 1300206 | 7/1969 | Fed. Rep. of Germany . | |
| 2000963 | 7/1971 | Fed. Rep. of Germany . | |
| 2101729 | 7/1971 | Fed. Rep. of Germany . | |
| 2039250 | 3/1972 | Fed. Rep. of Germany . | |
| 2232223 | 1/1973 | Fed. Rep. of Germany . | |
| 2637421 | 7/1977 | Fed. Rep. of Germany . | |
| 2745799 | 4/1978 | Fed. Rep. of Germany . | |
| 1389442 | 1/1965 | France . | |
| 2292539 | 6/1976 | France . | |
| 2362376 | 3/1978 | France . | |
| 2365788 | 4/1978 | France . | |
| 45-11123 | 4/1970 | Japan | 164/156 |
| 850141 | 9/1960 | United Kingdom | 164/453 |
| 479956 | 11/1975 | U.S.S.R. | 164/155 |

Primary Examiner—Nicholas P. Godici
Assistant Examiner—J. Reed Batten, Jr.
Attorney, Agent, or Firm—Brumbaugh, Graves, Donohue & Raymond

[57] ABSTRACT

During the continuous casting process, metal melt flows from a reservoir covered with a slag layer into a tundish covered with a slag layer, and from there into a mould. In order to prevent a damage to the strand or the continuous casting plant on account of the slag entry into the mould and the jeopardization of the operating personnel, the height of the metal-melt-bath level on the one hand and the height of the slag-bath level on the other hand are continuously determined. From the relation of these values the slag amount present in the tundish is determined.

4 Claims, 4 Drawing Figures

ARRANGEMENT FOR PREVENTING SLAG FROM PENETRATING INTO A CONTINUOUS CASTING MOULD DURING CONTINUOUS CASTING

BACKGROUND OF THE INVENTION

The invention relates to a method of preventing slag from penetrating into a continuous casting mould during the continuous casting of a metal melt, the metal melt flowing from a reservoir covered with a slag layer on top into a tundish covered with a slag layer on top, and from there into a mould.

With continuous casting, the metal melt both in the casting ladle and in the tundish is covered by a slag layer so as to be protected against heat losses and oxidation. The flowing of slag out of the tundish into the mould constitutes a great danger for the continuous casting plant and the operating personnel of the plant. Since slag is porous after its solidification, thus being a poor heat conductor, slag that enters the mould—besides constituting an impurification of the strand—forms only a thin and porous strand skin as soon as it comes to lie on the strand surface. This thin slag skin usually does not withstand the ferrostatic pressure of the strand, a strand breakthrough thus being possible. Furthermore, the cooling water used in the secondary cooling zone reaches the strand skin, thus causing explosions due to the formation of oxyhydrogen gas.

Various methods are known for indicating the streaming of slag out of a metallurgical vessel. Thus, e.g., in U.S. Pat. No. 4,079,918, a method is described in which the melt jet leaving a metallurgical vessel is watched by a ratio pyrometer in order to receive a signal when the slag starts running out of the metallurgical vessel. This method is, however, not suited for the continuous casting process, since with continuous casting the casting jet flowing into the mould usually is surrounded by a protection or casting tube and thus cannot be observed. Moreover, this method has the disadvantage that slag will not be noticed before it leaves the metallurgical vessel, so that, even if the outlet opening of the metallurgical vessel is closed immediately after having recognized the penetration of slag, a slag amount—though relatively slight it may be—will stream into the mould.

It is known to perform a density measurement of the melt streamed into the mould with the help of a radioactive element. This method is disadvantageous because the slag is recognizable only after its entry into the mould, and extensive protection measures against radioactive radiation are required.

SUMMARY OF THE INVENTION

The invention aims at avoiding these disadvantages and difficulties, and has as its object to provide a method of the initially defined kind as well as an arrangement for carrying out the method, with which it is possible to prevent damage at the strand, or at the continuous casting plant caused by the entry of slag into the mould.

This object is achieved according to the invention in that the height of the level of the metal-melt bath on the one hand, and the height of the level of the slag bath on the other hand, are continuously measured, the slag amount remaining in the tundish being determined from the relation of these values. As soon as the slag amount in the tundish becomes impermissibly high, i.e., if only a low amount of metal melt is present in the tundish, either the casting is stopped or the casting is interrupted and continued after the exchange of the tundish that contains too great a slag amount and of the casting ladle, respectively. In this manner, the entry of slag into the mould can be reliably prevented by the determination of the slag amount.

A preferred arrangement for carrying out the method, comprising a reservoir arranged above the tundish and a mould arranged below the tundish is characterized in that a floating body floating on the metal-melt-bath level and mounted on a carrying arm as well as a second floating body floating on the slag-bath level and also mounted on a carrying arm are provided, the two carrying arms being each provided with a measuring device for measuring the position assumed by each of the carrying arms. Suitably, the carrying arms are designed as pivot arms.

Advantageously, one pivot arm is extended beyond its pivot axis, the extension carrying a, preferably movable, counter weight.

According to another advantageous embodiment, induction loops are provided in opposite side walls of the tundish for determining the height of the metal-melt-bath level, one of which induction loops functions as a transmitter and at least one of which functions as a receiver.

A further advantageous embodiment is characterized in that an infrared camera is provided for determining the height of the slag-bath level.

BRIEF DESCRIPTION OF THE DRAWINGS

The invention will now be explained in more detail with reference to the accompanying drawings, wherein.

DESCRIPTION OF EXEMPLARY EMBODIMENTS

Figure 1:
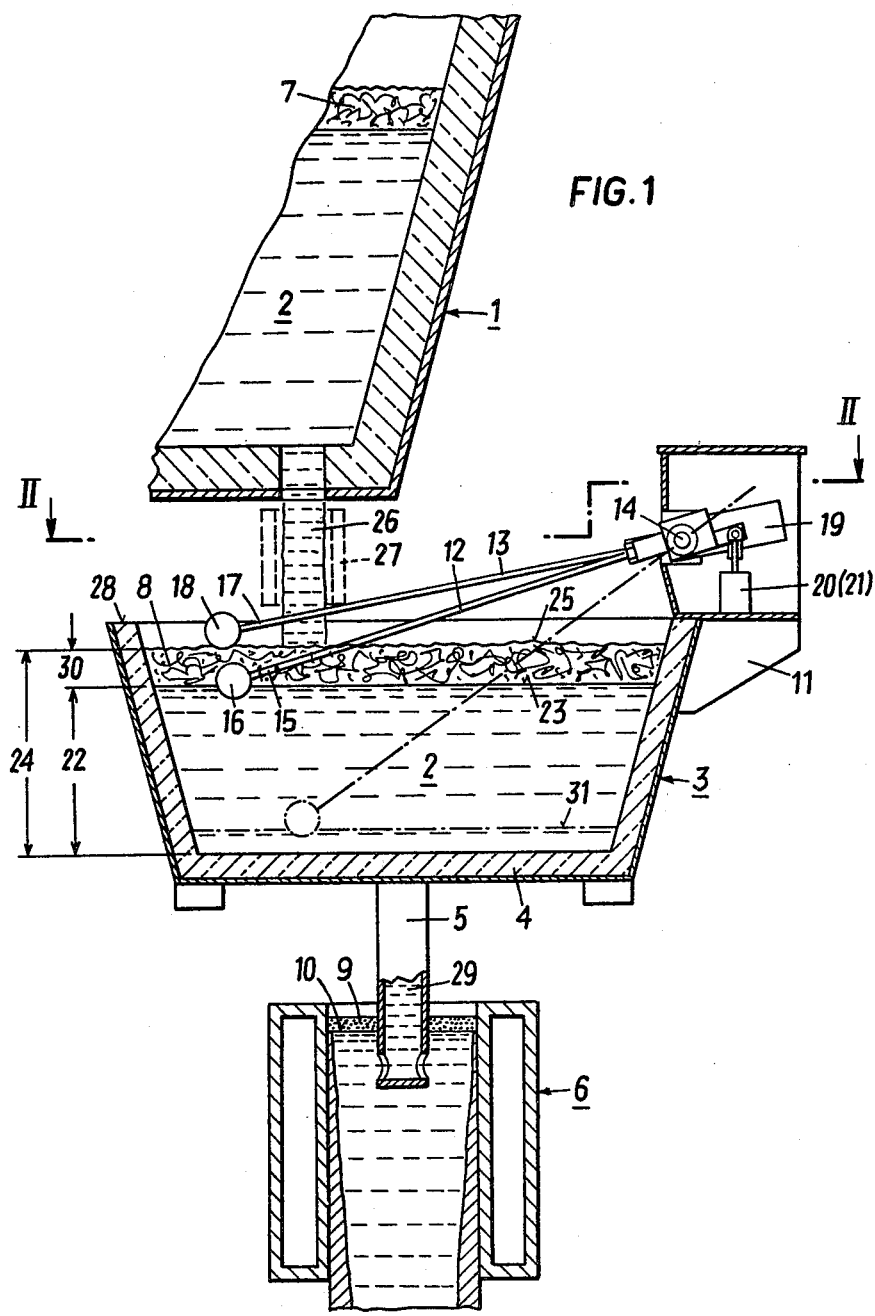
FIG. 1 is a schematically illustrated section through a reservoir, a tundish, and a mould, of a continuous casting plant.
Figure 2:
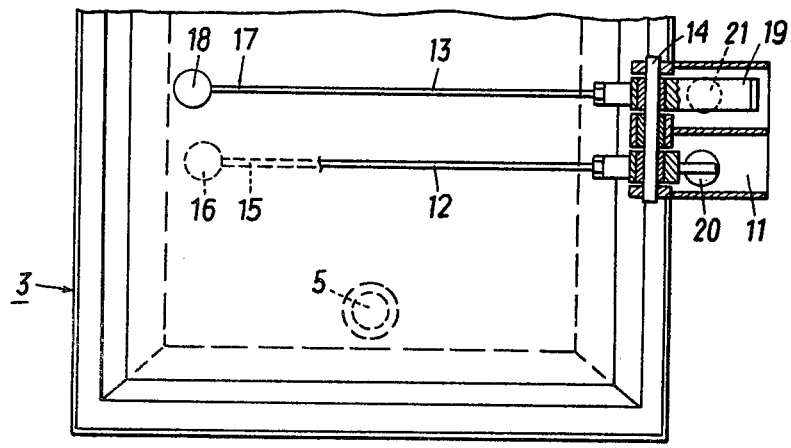
FIG. 2 is the partially sectioned ground plan of the tundish illustrated in FIG. 1, taken along the line II—II.

According to FIG. 1, metal melt, in the present case steel melt 2, flows from a reservoir which is designed as a casting ladel 1 into a tundish 3, and from there, through a casting tube 5 inserted in the bottom 4 of the tundish, into a continuous casting mould 6. The amount of steel melt flowing out of the casting ladle 1 per time unit may be regulated by means of a slide (not illustrated). In both the casting ladle 1 and in the tundish 3, the surface of the steel melt 2 is covered with a slag layer 7 and 8, respectively, protecting the steel melt 2 from heat losses and preventing the oxidation of the steel melt. In the mould 6, the surface 10 of the steel melt is covered with a casting powder 9.

On a console 11 laterally fastened at the tundish, two carrying arms designed as pivot arms 12, 13 are mounted so as to be pivotable about a horizontal axis 14, one (12) of the pivot arms being provided, on its front end 15, with a floating body 16 whose specific weight is less than the specific weight of the metal melt 2 and greater than the specific weight of the molten slag 8. The second pivot arm 13, on its front end 17, also comprises a floating body 18 whose specific weight, however, is less than the specific weight of the molten slag 8. The immersion depth of the floating body 18 can be adjusted by a suitably adjustable counter weight 19 provided on the rear end of this pivot arm 13. Both pivot arms 12, 13 are coupled at their rearward ends with measuring means 20, 21 for measuring the respective position assumed by each of the pivot arms. These measuring means advantageously are designed as inductive transmitters. It is possible at any time to determine the height 22 of the metal-melt-bath level 23 with the help of the first pivot arm 12 and the height 24 of the slag-bath level 25 with the help of the second pivot arm 13.

As is indicated in FIG. 1 in broken lines, the free observation of the melt jet 26 flowing from the casting ladle 1 into the tundish 3 often is impeded by a protection tube 27, with continuous casting, so that it cannot be found out easily whether slag is flowing into the tundish. When emptying the ladle, it may happen that slag mixed with steel flows into the tundish 3, so that an unduly great amount of slag gathers in the tundish 3, i.e., that the metal-melt-bath level 23 has already sunk very low; thus although the slag-bath level 25 is near the upper rim 28 of the tundish 3, the amount of metal melt 2 present in the tundish may not be recognizable. However, an unduly great amount of slag may gather in the tundish 3 also if several casting ladles 1 are teemed off one after the other into the same tundish, slag thus entering the tundish every time a casting ladle is teemed off. Because the casting jet 29 entering the mould 6 is withdrawn from a free observation by the casting tube 5, it consequently may happen that slag flows into the mould 6 without being noticed, even with the tundish 3 being full.

From the difference between the simultaneously measured values for the height 24 of the slag-bath level 25 and the height 22 of the metal-melt-bath level 23, the height, i.e., the thickness 30, of the slag layer 8 in the tundish 3 and thus the amount of slag may be determined. It is thus possible either to stop casting when the amount of steel melt in the tundish 3 is too low, or to continue casting after having exchanged the tundish 3 and the casting ladle 1 for corresponding vessels containing a sufficiently great amount of steel melt.

It is essential with the arrangement according to the invention that the slag amount present in the tundish 3 can be exactly determined at any time, so that it is possible to take the above measures, namely the interruption of casting and the exchange of the casting ladle 1 and the tundish 3 already when the metal-melt-bath level has reached a predetermined minimal value. This minimal metal-melt-bath level is denoted by 31. The entry of slag into the mould 6 can thereby be safely prevented. If the minimal metal-melt-bath level 31 is reached with the slag-bath level being low at the same time, the casting procedure is not interrupted, but is maintained with an increased entry of metal melt out of the casting ladle 1 into the tundish 3.

Figure 3:
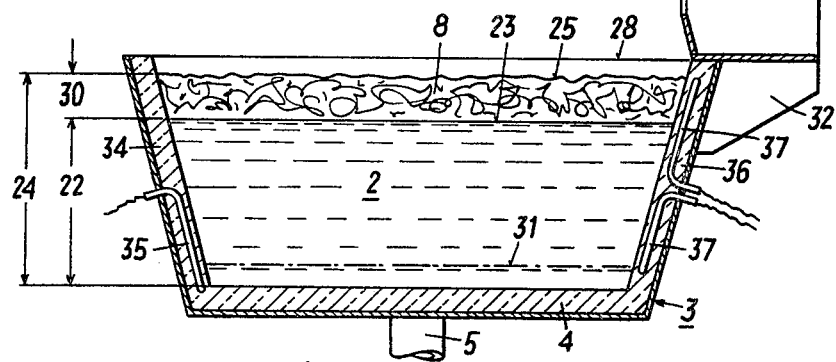
FIG. 3 represents a section through a tundish in an illustration analogous to FIG. 1.
Figure 4:
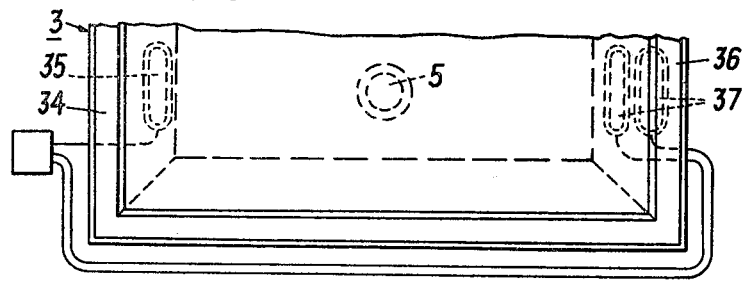
FIG. 4 is a ground plan of this tundish.

With the embodiment illustrated in FIGS. 3 and 4, an infrared camera 33 or any other optical measuring device, such as for instance a pyrometer, is mounted on a console 32 arranged laterally on the tundish 3, by which the height 24 of the slag-bath level 25 present in the tundish 3 can continuously be determined. The determination of the amount of steel melt 2 is effected in an inductive manner according to this exemplary embodiment. For this purpose, an inductive transmitter 35 designed as an induction loop is installed in a side wall 34 of the tundish 3 as well as two inductive receivers 37 designed as induction loops are installed in the opposite side wall 36 of the tundish, triggering a signal corresponding to the respective height 22 of the metal melt 2. The determination of the slag amount in this case takes place also by the resulting difference between the height 24 of the slag-bath level 25 and the height 22 of the metal-melt-bath level 23.

The invention is not limited to the embodiments illustrated in the drawings, but may be modified in various aspects. Thus, it is for instance possible to combine the infrared camera 33 for measuring the height 24 of the slag-bath level 25 with the pivot arm 12 represented in FIG. 1 for measuring the height 22 of the metal-melt-bath level 23, or to use the inductive measuring means 35, 37 for measuring the height 22 of the metal-melt-bath level 23 together with the pivot arm 13 of FIG. 1 with which the height 24 of the slag-bath level 25 is measured.

What we claim is:

1. In an arrangement at a continuous casting plant for preventing slag from penetrating into a continuous casting mould during the continuous casting of a metal melt, which arrangement includes a tundish, a reservoir arranged above said tundish, said continuous casting mould being arranged below said tundish, said metal melt flowing from said reservoir covered with a slag layer on top into said tundish covered with a slag layer on top and fron said tundish into said continuous casting mould, and a metal-melt-bath level and a slag-bath level being formed in said tundish, the improvement comprising a first floating body mounted on a first carrying arm and floating on said metal-melt-bath level, a second floating body mounted on a second carrying arm and floating on said slag-bath level, a first measuring means connected with said first carrying arm and a second measuring means connected with said second carrying arm, said first and said second measuring means being adapted to measure the position assumed by the respective one of said first and said second carrying arms.

2. An arrangement as set forth in claim 1, wherein said first and said second carrying arms are designed as pivot arms.

3. An arrangement as set forth in claim 2, wherein one of said pivot arms is designed to have an extension reaching beyond its pivot axis, and further comprising a counter weight provided on said extension.

4. An arrangement as set forth in claim 3, wherein said counter weight is displaceable.

* * * * *